Feb. 12, 1924.

C. A. BAKER

VALVE MECHANISM

Filed Aug. 12, 1922

1,483,153

INVENTOR
C. A. Baker.
BY Arthur E. Brown
ATTORNEY

Patented Feb. 12, 1924.

1,483,153

UNITED STATES PATENT OFFICE.

CHESTER A. BAKER, OF OMAHA, NEBRASKA.

VALVE MECHANISM.

Application filed August 12, 1922. Serial No. 581,531.

*To all whom it may concern:*

Be it known that I, CHESTER A. BAKER, a citizen of the United States, residing at Omaha, in the county of Douglas and State of Nebraska, have invented certain new and useful Improvements in Valve Mechanism; and I do declare the following to be a full, clear, and exact description of the invention, such as will enable others skilled in the art to which it appertains to make and use the same, reference being had to the accompanying drawings and to the figures of reference marked thereon, which form a part of this specification.

This invention relates to valve mechanisms for compressors.

Air and gas compressors are usually provided with pistons having ports through which the refrigerant in the vapor phase passes to a compression chamber where the refrigerant is put under compression and forced into the line through valved outlets in the head of the compressor.

My invention contemplates valve mechanism which will be simple in construction, and which may be readily assembled or taken apart, as the occasion may demand. The invention also contemplates the provision of means whereby the valves will readily seat upon the seats of the ports or orifices and to this end the invention consists in certain novel parts and combinations of parts, all of which will be referred to hereinafter, reference being had to the accompanying drawings, in which—

Figure 1:
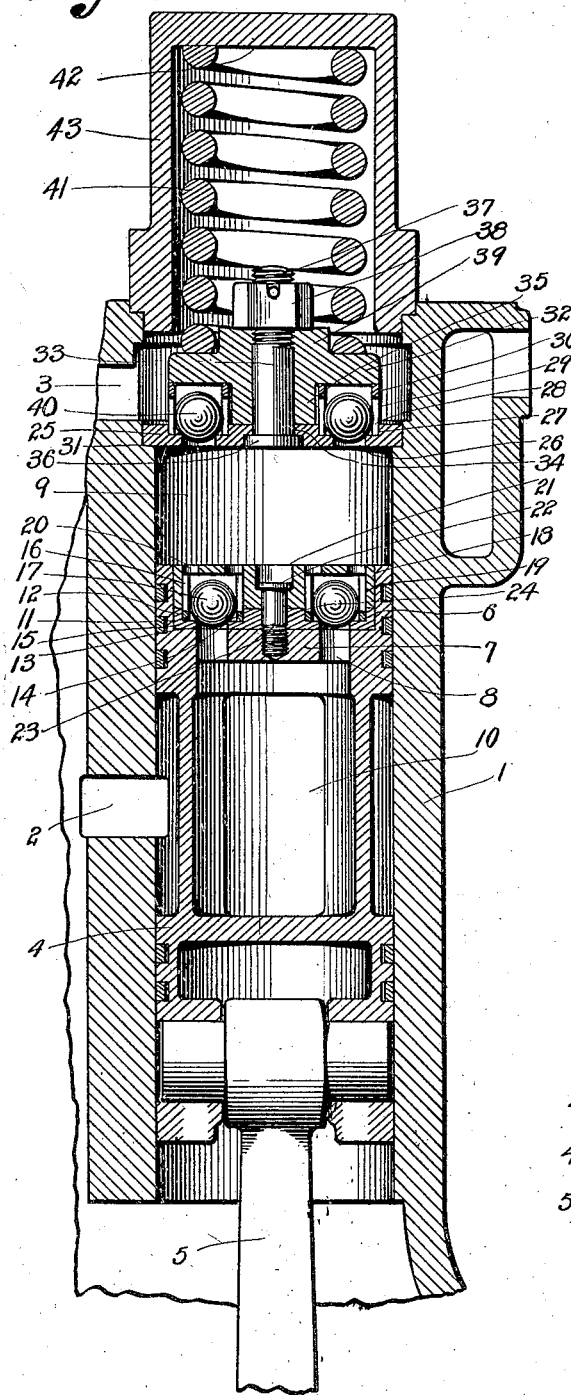
Fig. 1 is a vertical, longitudinal, sectional view through a compressor cylinder, piston and cylinder head constructed in accordance with my invention.

The compressor is shown as comprising a cylinder 1 having a vapor inlet port 2 and a discharge port 3. Reciprocatorily mounted within the cylinder 1 is a piston 4, driven by any suitable means as, for example, a crank shaft connected to the connecting rod 5, the connecting rod being mounted on the piston in an appropriate manner.

The hollow piston 4 is provided with an end recess 6, the wall 7 of which is provided with a plurality of orifices or ports 8 through which the vapor may escape into the compression chamber 9, it being understood that the piston is provided with orifices to permit the vapor to pass from the inlet port 2 into the chamber 10 of the piston.

The recess 6 carries a piston valve mechanism comprising a disk 11, having a plurality of countersunk recesses 12 in axial alignment with ports or orifices 13, which align with those designated 8 when the disk 11 is properly positioned within the recess 6.

Cylindrical valve cages 14 are provided in the countersunk recesses 12, the valve cages comprising rings 15 with upstanding fingers 16, the rings entering the recesses as shown in Fig. 1. The cages constitute guides for the spherical valves 17, which are adapted to close the port 13 when seated. The valve cages are held in position by a positioning member comprising a disk 18 provided with recesses 19 aligning with the recesses 12, the top of the disk having ports or openings 20 through which the vapor may escape into the compression chamber 9. The center of the member 18 is provided with a recess 21 to receive the head 22 of a bolt 23, which may pass through the central opening 24 in the disk 11 and into the floor 7 of the recess 6 in the piston.

The members 11 and 18, when secured together, constitute a housing or valve case in which the valve cages are fastened, the spherical or ball valve 17 having play longitudinally of the piston so that they can seat and unseat when the piston moves in or away from the cylinder head 25.

The vapor will enter through the port 2 into the chamber 10 and will pass through the openings 3, past the valve, through the openings 20 and into the chamber 9. When the piston moves toward the head 25, the valve will seat so that the refrigerant or vapor, gas or other compressible fluid may be forced out through the openings 26 in the head and through the outlet port 3. The openings 26 are surrounded by countersunk recesses 27 which receive the fingers 28 of the valve cages 29, the fingers being connected at their upper ends by rings 30. In other words, the valve cages 29 are inverted with respect to the valve cages 15 but in other respects they resemble them.

The cylinder end 25 is normally seated on a shoulder or seat 31 in the top of the cylinder end and it is connected to a valve cage positioning disk 32 by a bolt 33, which passes through the opening 34 in the disk 25 and through a hub on the boss 35 in the center of the disk 32. The head 36 of the bolt 33 is received in a recess in the disk 25 and the threaded end 37 of the bolt receives a nut 38, which may be screwed down upon the collar 39 on the disk 32 to bind the boss 35 against the upper face of the disk 25.

The balls 40 in the cages 29 have an up-and-down movement similar to the balls 17. When the piston moves to fluid-compressing position, the balls 17 will be closed but the balls 40 will unseat so that the fluid may pass into the outlet opening 3. Normally the cylinder head will be seated on the seat 31 so that it will constitute a stationary head. It is held in that position by a coil spring 41, one end of which bears against the upper end 42 of a hood 43 carried by the cylinder, the other end of the spring surrounding a collar and bearing upon the upper face of the disk 32.

In the event that moisture or liquid is received in the compression chamber, the cylinder head would be blown off if it could not give so I have provided the spring so the disk 32 can unseat to enlarge the compression chamber in the event that liquid is received therein. The idea of allowing the cylinder head to move off its seat, however, for the purpose of varying the size of the compression chamber is not new, the broad idea being used prior to my invention. My invention resides more particularly in the arrangement of the valve mechanism.

It will be apparent that the balls 17 will readily unseat when the piston is on its out-stroke and will readily seat when the piston is on its in-stroke. The balls 40, however, will seat when the piston is on its out-stroke and unseat when the piston is on its in-stroke. Therefore, the balls 17 and 40 alternately function to open and close their respective ports.

Figure 4:
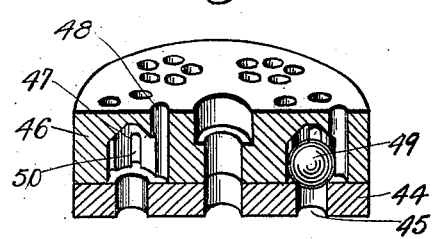
Fig. 4 is a slightly modified form of piston valve mechanism.

In Fig. 4 I have shown a slightly modified form of valve mechanism for the piston in which the disk 44 is provided with openings 45 which may register with the ports 8 in the piston. The housing member 46 is provided with grooved recesses 47 communicating with the ports 48 so that when the balls 49 unseat, the fluid can pass through the port 8, through port 45, through recesses 47 to ports 48 and into the compression chamber 9.

Figure 2:
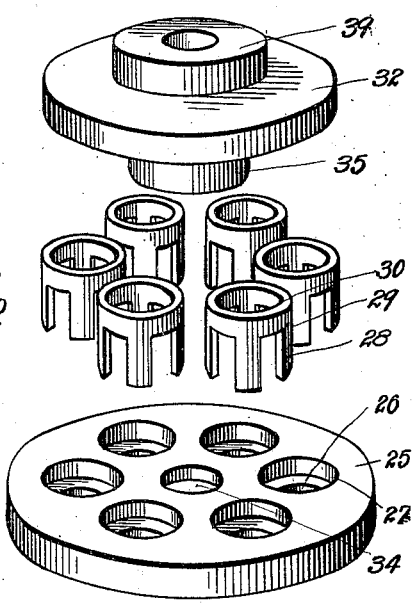
Fig. 2 is a disassociated perspective view of the cylinder head and the valve cages.
Figure 3:
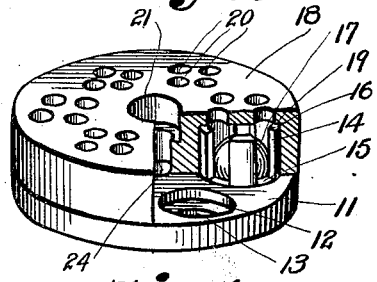
Fig. 3 is a detail perspective view of the piston valve mechanism, part being cut away to show the interior construction.

The structure shown in Fig. 4 very closely resembles the construction shown in Fig. 3 except that in lieu of the valve cages I provide longitudinal grooves 50 in the recesses 47. The structure shown in Fig. 4 can be fastened to the member 7 of the piston by bolts similar to 22; that is, the structure shown in Fig. 4 can be interchangeable with the structure shown in Fig. 3 although I prefer the construction shown in Fig. 3 in connection with the structure shown in Fig. 2. In other words, the assembly shown in Fig. 1 is the preferred form.

It will be apparent from the foregoing that the valve mechanisms may be readily assembled and taken apart, that they can be inexpensively manufactured, and that they are adapted to efficiently perform their respective functions.

What I claim and desire to secure by Letters Patent is:

1. A valve mechanism for compressors comprising two disks, at least one of which is provided with a circular series of recesses about its center, valve cages in the recesses, each valve cage comprising a ring having longitudinal fingers projecting therefrom, means for clamping the valve cages between the disks, and ball valves in the valve cages.

2. A valve mechanism for compressors comprising two disks, one of which is provided with a plurality of ports, recesses concentric with the ports, valve cages in the recesses, ball valves in the valve cages, and means for clamping the valve cages between the disks.

3. A valve mechanism for compressors comprising two disks, a concentric series of valve cages interposed between the disks, the valve cages being received in recesses in at least one of the disks and one of the disks at least having ports, valves in the valve cages for opening and closing said ports, and a fastening member passing through the centers of the two disks to secure them together and to thereby clamp the valve cages between the disks.

4. A valve mechanism for compressors comprising a disk having a concentric series of recesses, ports in the bottoms of the recesses, valve cages in the recesses surrounding the ports, each valve cage comprising a ring having longitudinally projecting fingers, balls in the valve cages having free movement therein, a second disk parallel with the first and having a face for engagement with the ends of the valve cages, and means for fastening the two disks together to retain the valve cages between them.

In testimony whereof I affix my signature.

CHESTER A. BAKER.